United States Patent [19]

Moser

[11] Patent Number: 4,719,941

[45] Date of Patent: Jan. 19, 1988

[54] THROTTLE VALVE

[75] Inventor: Bernd Moser, Hamm, Fed. Rep. of Germany

[73] Assignee: Boge GmbH, Eitorf, Fed. Rep. of Germany

[21] Appl. No.: 941,522

[22] Filed: Dec. 12, 1986

Related U.S. Application Data

[63] Continuation of Ser. No. 772,306, Sep. 4, 1986, abandoned.

[30] Foreign Application Priority Data

Sep. 4, 1984 [DE] Fed. Rep. of Germany ....... 3432466

[51] Int. Cl.$^4$ .......................... F15D 1/14; F16K 31/06
[52] U.S. Cl. .................................... 137/599; 137/601; 138/43
[58] Field of Search ............... 138/43 X, 42; 137/599, 137/601, 268

[56] References Cited

U.S. PATENT DOCUMENTS

| | | | |
|---|---|---|---|
| 2,559,069 | 7/1951 | GBX | 138/42 |
| 2,907,346 | 10/1959 | Fortune | 137/601 |
| 3,900,299 | 8/1975 | Spehrley | 137/601 X |
| 4,170,245 | 10/1979 | Haley | 137/599 X |
| 4,207,919 | 6/1980 | Hutton | 137/599 X |
| 4,300,596 | 11/1981 | Burke | 137/599 X |

FOREIGN PATENT DOCUMENTS

| | | | |
|---|---|---|---|
| 2500682 | 7/1975 | Fed. Rep. of Germany | 137/599 |
| 2602328 | 12/1979 | Fed. Rep. of Germany | . |
| 2940182 | 4/1980 | Fed. Rep. of Germany | . |
| 0121344 | 9/1980 | Japan | 137/601 |

Primary Examiner—Martin P. Schwadron
Assistant Examiner—Stephen M. Hepperle
Attorney, Agent, or Firm—Nils H. Ljungman

[57] ABSTRACT

A throttle valve having a housing defining a cavity, with structures providing a flow channel within the cavity, and an inlet and outlet in communication with the flow channel. The throttle valve also includes a valve closure in the form of a plurality of individually-controlled electromagnets disposed in the housing cavity, with each having an armature projectable into the flow channel, so as to influence the cross section of the flow channel and thereby regulate the amount of fluid flow through the flow channel.

9 Claims, 9 Drawing Figures

THROTTLE VALVE

This application is a continuation of U.S. application Ser. No. 06/772,306, filed on Sept. 4, 1986.

BACKGROUND OF THE INVENTION

1. Field of the Invention

The present invention generally relates to a throttle valve for regulation of fluid flow and, more particularly, to a throttle valve having a housing with an inlet and outlet and an electromagnetically-actuated valve closing body located in the housing for regulating the amount of flow in a flow channel located in the housing between its inlet and outlet.

2. Description of the Prior Art

It is known in throttle valves of the prior art, such as the type disclosed in German Pat. No. DE-PS 26 02 328, that a flow quantity can be regulated. Furthermore, when a valve closure of such throttle valve type is shifted from its neutral position, small flow rates of the flow quantity can be precisely set.

However, such throttle valves have several disadvantages. First, a rapid switching frequency is not possible. Second, the flow quantity cannot be adjusted over a very wide range.

OBJECTS OF THE INVENTION

An object of the present invention, therefore, is to provide a throttle valve in which a flow quantity can be controlled independently of the direction of flow.

A further object of the invention is to provide a throttle valve in which the flow quantity can be regulated in stages and as desired, whereby simultaneously a fast-reaction control of the flow can be achieved.

SUMMARY OF THE INVENTION

The present invention relates to a throttle valve which overcomes the aforementioned disadvantages of the prior art throttle valve and achieves the above objectives by the employment of a valve closure which includes at least one individually-controlled electromagnet having a coil body with a winding and an armature, which directly or indirectly acts on the cross section of the flow channel of the valve.

An advantage of such an embodiment of the throttle valve is that a simple control is possible, free of interference, in that the armature of the electromagnet directly regulates the flow quantity by immersion in the flow channel. In such a manner, the armature can completely or only partly close off the flow channel, so that a continuously-flowing residual current is possible.

Another essential characteristic of the present invention is that the armature of the throttle valve is oriented transverse to the center axis of the flow channel. This arrangement is advantageous because such a throttle valve can be operated independently of the flow direction. As a result of the introduction of the armature in the flow channel, the flow resistance is affected accordingly.

In an especially advantageous embodiment of the throttle valve, there is at least one chamber oriented transverse to the flow direction as the flow channel. Here, the fluid is conducted radially outward into the chamber as it flows through the throttle valve, so that armatures of the valve distributed over the entire circumference of the chamber can influence the flow resistance. In such a throttle valve, there are several electromagnets, so that by means of parallel control and a large number of armatures, not only can the flow be regulated within a broad range, but a fast-reaction, simple and interference-free control becomes possible. A rapid switching frequency now becomes possible as a result of the parallel control of each electromagnet.

To achieve a further variability of the flow quantity, another preferred embodiment of the throttle valve provides a flow channel made up of several individual channel portions. Each of the channel portions extends between and is connected with the inlet and outlet of the valve. At least one armature of an electromagnet is immersed in each channel.

Another advantage of this embodiment of the throttle valve is that the flow channel can be divided into a desired number of individual channels which can be regulated independently of one another. Each individual channel is thereby acted upon by an electromagnet provided with an armature. Flow regulation is achieved by the immersion of the armature in the channel. As a result of parallel control of the electromagnets, each channel can be acted on individually, and all channels can also be acted upon together with regard to the flow resistance. It does not matter whether the individual flow channels have the same cross section or different cross sections. Depending on the embodiment of the throttle valve, the armature and its projected area can be appropriately adapted.

In addition, in one embodiment of the throttle valve, the channels run radially transverse to the direction of flow, with the electromagnets arranged in the direction of flow. The individual channels run radially outward in a star pattern, and are then diverted into other return channels, from radially outward to radially inward. Thus, electromagnets with armatures can be placed both in the outward channels and the return channels, depending on the desired flexibility and switching speed.

These and other advantages and attainments of the present invention will become apparent to those skilled in the art, upon a reading of the following detailed description when taken in conjunction with the drawings, wherein there is illustrated and described preferred embodiments of the invention.

BRIEF DESCRIPTION OF THE DRAWINGS

In the course of the following detailed description, reference will be made to the attached drawings, in which.

DESCRIPTION OF THE PREFERRED EMBODIMENTS

Figure 1:
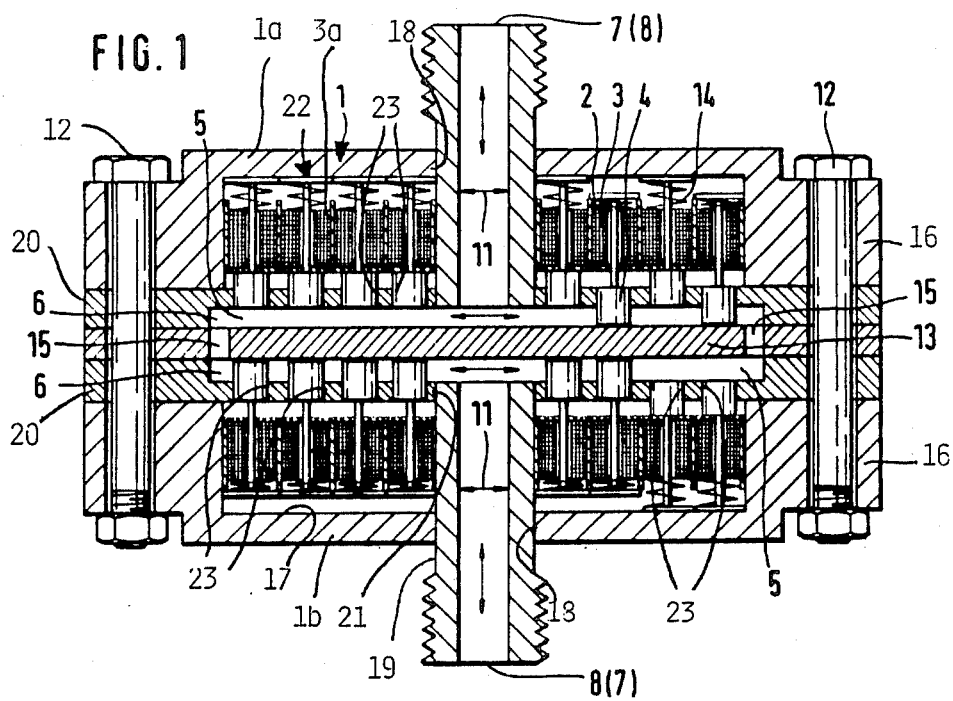
FIG. 1 is an axial sectional view, with some parts in elevation, of one embodiment of a throttle valve constructed in accordance with the principles of the present invention, the valve having a flow channel defined therein and a valve closure in the form of a plurality of flow regulating electromagnets with armatures being arranged in the axial direction for projection into the flow channel.

Referring now to the drawings, wherein identical reference numerals refer to like elements and particularly to FIG. 1, there is shown a preferred embodiment of the throttle valve of the present invention. The throttle valve includes a housing 1 formed of two individual recessed circular parts 1a and 1b which, at their peripheral flanges 16, are connected together and sealed by suitable means, such as bolts 12, to define a cylindrical cavity 17 in the housing 1. Each housing part 1a and 1b has a central opening 18 through which a tubular stem 19 is inserted and attached to the housing 1. A pair of spaced recessed circular plates 20, disposed in facing relation to one another across the cylindrical cavity 17 and between the sealed housing parts 1a and 1b, define a flow channel 5 therebetween. Each of the circular plates 20 has a central hole 21 into which the end of one of the tubular stems 19 is inserted and attached to the circular plate 20. In such an arrangement, one of the tubular stems 19 defines an inlet 7, and the other tubular stem 19 defines an opposite outlet 8 to the flow channel 5. Orifices defining the outlet 8 and the inlet 7 of the tubular stems 19 have diameters 11.

The throttle valve also includes a valve closure, generally designated 22, disposed in the housing cavity 17 and being actuatable to project into the flow channel 5 to regulate the amount of fluid flow therethrough between the valve inlet 7 and valve outlet 8. In particular, the valve closure 22 is in the form of at least one, and preferably, a plurality of electromagnets 2 disposed in the respective recessed housing parts 1a and 1b. Each electromagnet 2 is composed of a coil body 3 with a winding 3a and an armature 4. Each of the spaced circular plates 20 contain a plurality of passages 23, being arranged in a pattern which matches that of the arrangement of the electromagnets 2, such that their respective armatures 4 are aligned for reciprocatory movement through the passages 23.

Further, the throttle valve has a middle circular disk 13 disposed across the cylindrical cavity 17 and between the sealed circular housing parts 1a and 1b and recessed circular plates 20, so as to divide the flow channel 5 into two individual annular chambers 6. Each individual annular chamber 6 is in communication either with the inlet 7 or the outlet 8. Specifically, the middle circular disk 13 contains a series of flow by-pass channels 15, spaced apart circumferentially about its periphery, through which the annular chambers 6 of the flow channel 5 communicate with one another. Since the flow can go in either direction through the valve, it does not matter whether the inlet 7 and the outlet 8 change places. When fluid flows through the throttle valve, a selected armature 4 is placed or moved, relative to its respective circular plate 20, into one of the annular chambers 6 by each individual electromagnet 2 in response to a corresponding control signal. Thus, the flow resistance through the annular chambers 6 of the flow channel 5 can be influenced as a function of the number of armatures 4 immersed in the fluid flow. The flow by-pass channels 15 bring about a uniform distribution of the fluid in the annular chambers 6.

Figure 2:
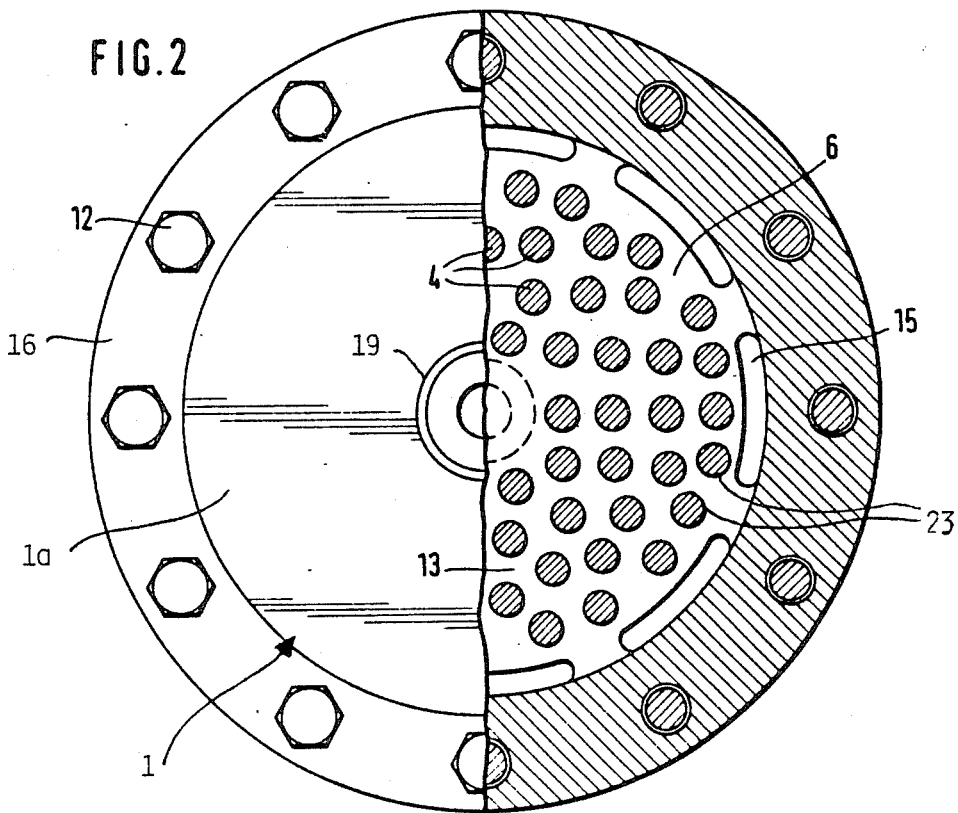
FIG. 2 is a top plan view, partly in section, of the throttle valve illustrated in FIG. 1, but with all of the armatures projecting into the flow of fluid in the flow channel.

FIG. 2 shows the throttle valve of FIG. 1, in which the armatures 4 of the valve closure 22 (shown in FIG. 1) close off almost completely a respective annular chamber 6, when a control signal is given simultaneously to all of the armatures 4. Since the individual electromagnets 2 can be controlled in parallel and individually, there is a high degree of flexibility of the flow control.

Figure 3:
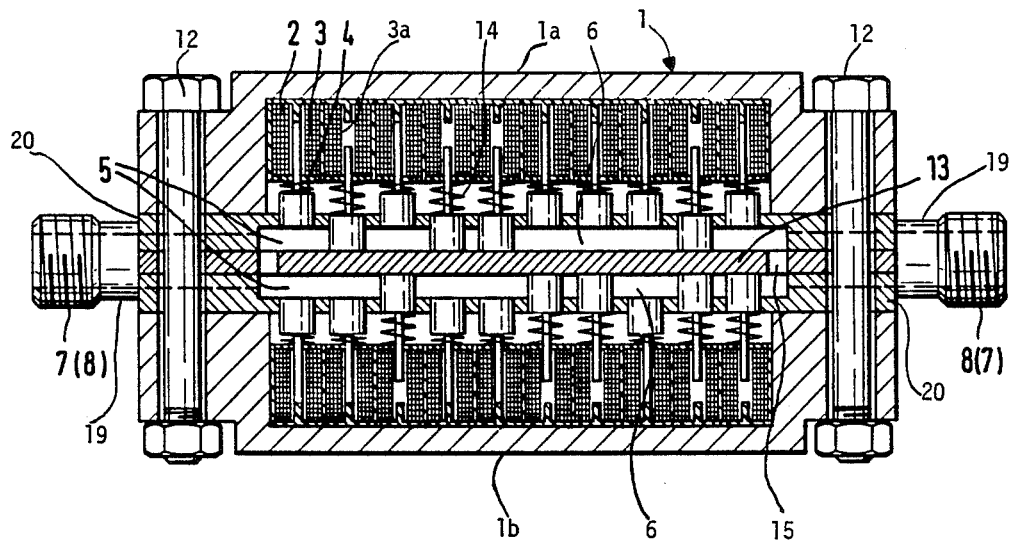
FIG. 3 is an axial sectional view, with some parts in elevation, of another embodiment of the throttle valve of the present invention, the valve having a flow channel which runs in the direction of the valve inlet and outlet with a large number of electromagnets with armatures.

FIG. 3 depicts another embodiment of the throttle valve, in which the inlet 7 and the outlet 8 coincide with the axial direction of the flow channel 5. In this embodiment, there is also a large number of electromagnets 2, whose armatures 4 become immersed in the fluid is the flow channel 5 and thus variably regulate or interrupt the flow when the control signal is given to the electromagnets 2. Moreover, in this embodiment, the electromagnet 2 is composed of a coil body 3 with an appropriate number of windings 3a and an armature 4, which is immersed directly in the flow channel 5.

Figure 4:
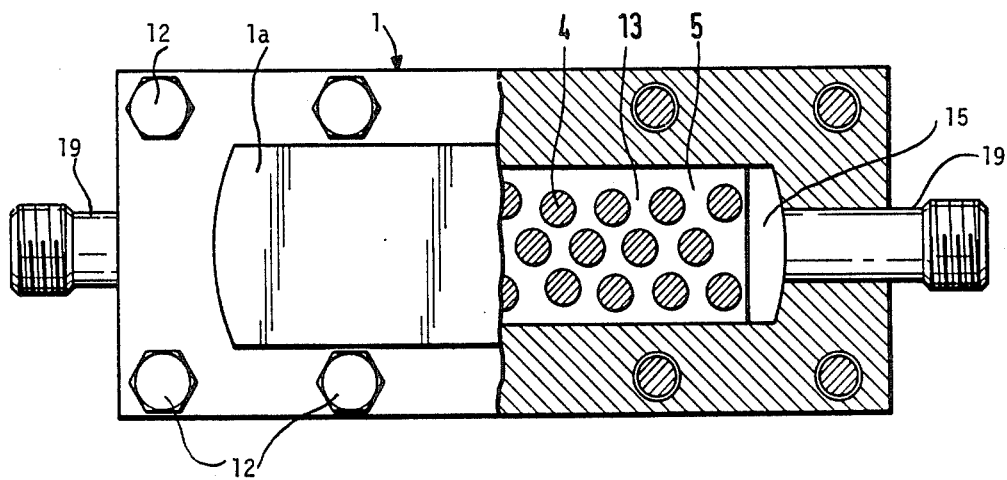
FIG. 4 is a top plan view, partly in section, of the throttle valve illustrated in FIG. 3.

Again in FIG. 4, the embodiment of the throttle valve shown in FIG. 3 has the flow channel 5 equipped with an appropriate number of armatures 4, which substantially reduces the flow channel 5 when a control signal is sent to all of the armatures simultaneously.

In the embodiment depicted by FIGS. 3 and 4, a substantially planar plate 13 (which corresponds to the circular disk 13 of the embodiment shown in FIGS. 1 and 2) divides the interior or chamber of housing 1 into first and second subchambers 6.

Substantially planar plate 13 is provided with throughgoing passages 15 which establish fluid communication between first and second subchambers 6. Passages 15 are formed as apertures in plate 13 and are thus of substantially constant cross sectional area.

The positioning of each armature 4 is determined by the state of energization of its associated electromagnetic coil 2. The electromagnetically actuated armatures 4 are bistable in the sense that, if any coil 2 is energized, the associated armature 4 is withdrawn from plate 13 and retracted into housing 1, while deenergization of a coil 2 causes an associated armature 4 to project into one of first and second subchambers 6 and directly abut plate 13.

Figure 5:
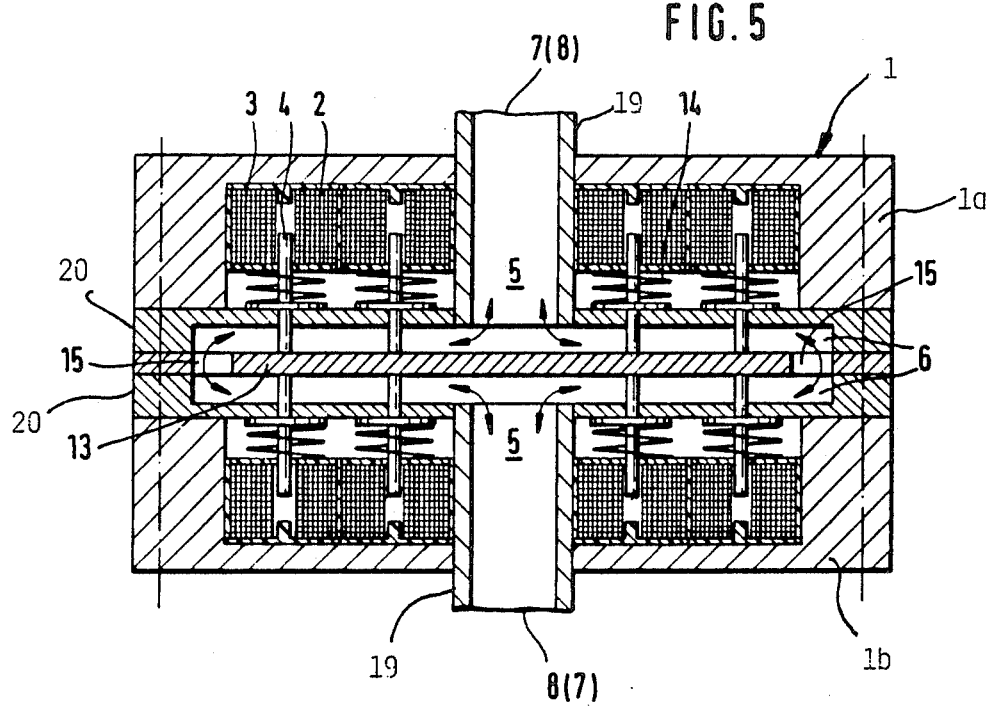
FIG. 5 is an axial sectional view, with some parts in elevation, of still another embodiment of the throttle valve, being similar to the embodiment shown in FIG. 1, wherein each of the armatures has generally the same diameter.

FIG. 5 depicts a throttle valve which is overall generally similar to the embodiment shown in FIG. 1, in which the flow channel 5 is formed by the annular chambers 6, and the axial fluid flow from the inlet 7 to the outlet 8 is blocked by the middle circular disk 13. As illustrated by the arrows, the fluid must flow radially outward into the one annular chamber 6 which is in communication with the inlet 7, and back through the flow by-pass channels 15 into the other annular chamber 6 which is in communication with the outlet 8. The armatures of the electromagnets 2, when projected and immersed into the respective annular chambers 6, come into contact with the adjacent surface of the middle circular disk 13. In this embodiment, all of the armatures 4 have the same diameter.

Figure 6:
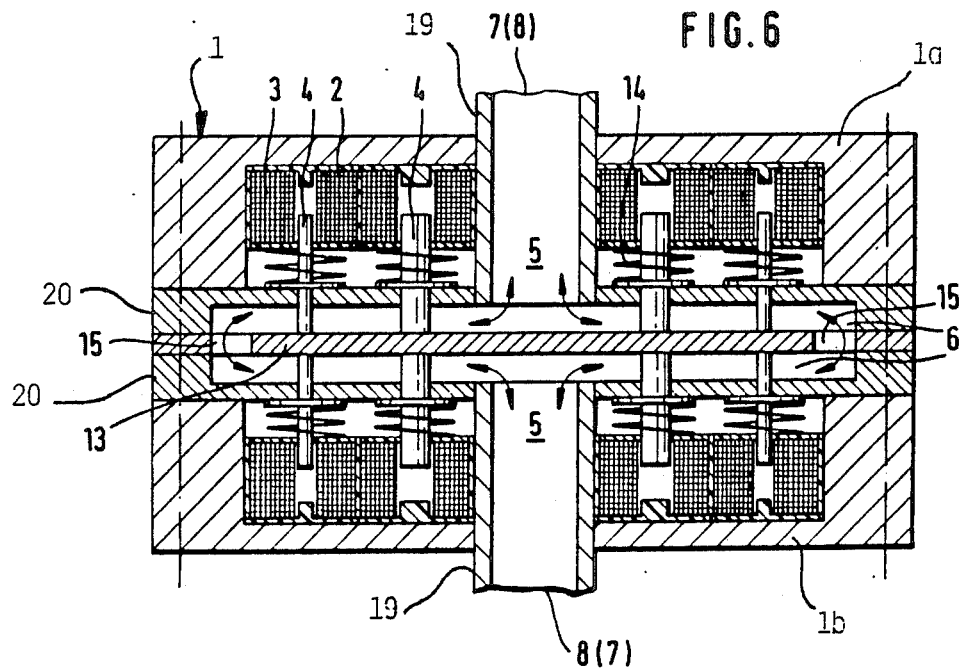
FIG. 6 is an axial sectional view, with some parts in elevation, of yet another embodiment of the throttle valve, being generally similar to the embodiment of FIG. 5, but with the armatures having different diameters.

FIG. 6, on the other hand, shows an embodiment of the throttle valve in which, in order to increase flexibility in controlling the flow resistance, the electromagnets 2 have armatures 4 which have different diameters. Accordingly, another flow characteristic can be appropriately set and achieved. With this embodiment, as well as with all the embodiments, any desired number of armatures 4 can be controlled in parallel to achieve a desired flow resistance.

Figure 7:
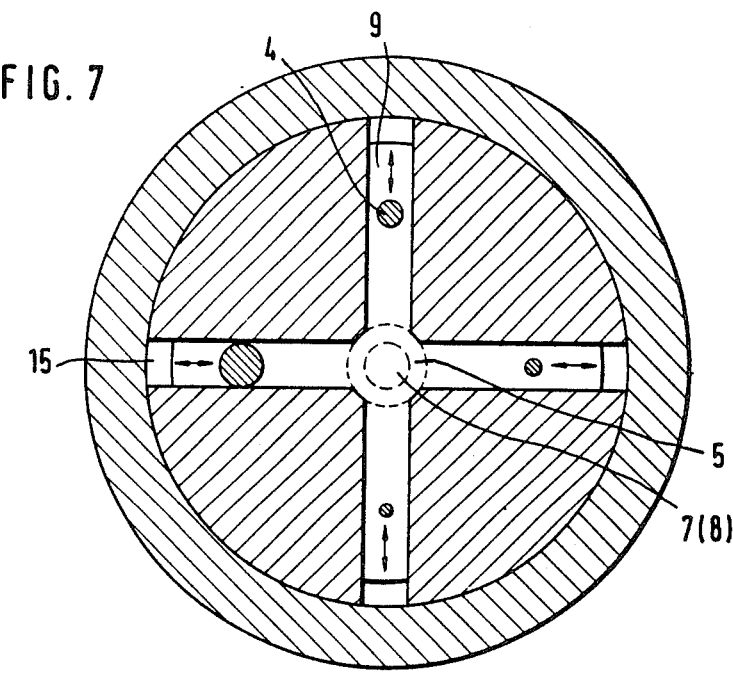
FIG. 7 is a sectional view taken transverse to the axis of another embodiment of the throttle valve, showing an arrangement with four channels running radially with armatures disposed therein, having different diameters.
Figure 8:
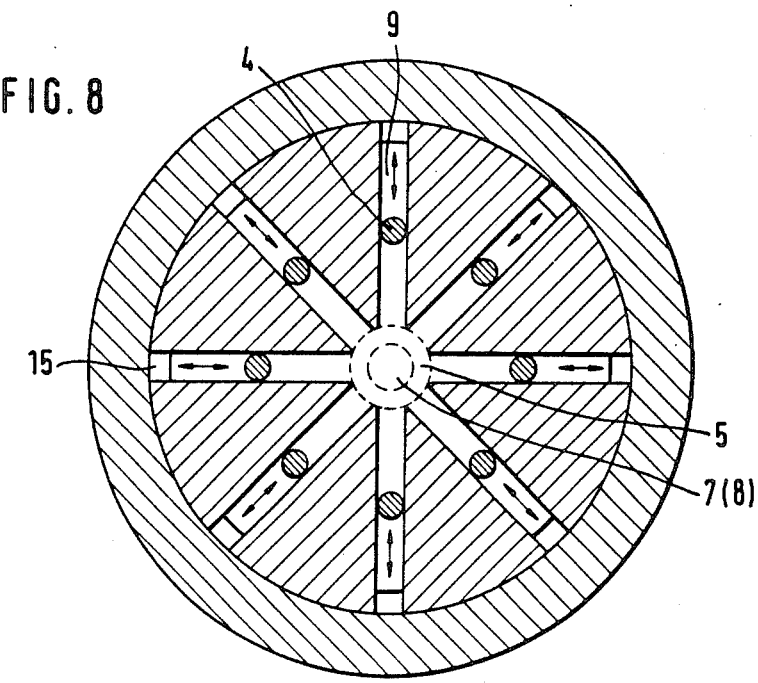
FIG. 8 is a sectional view of still another embodiment of the throttle valve, similar to FIG. 7, but showing an arrangement of eight channels running in a star pattern.
Figure 9:
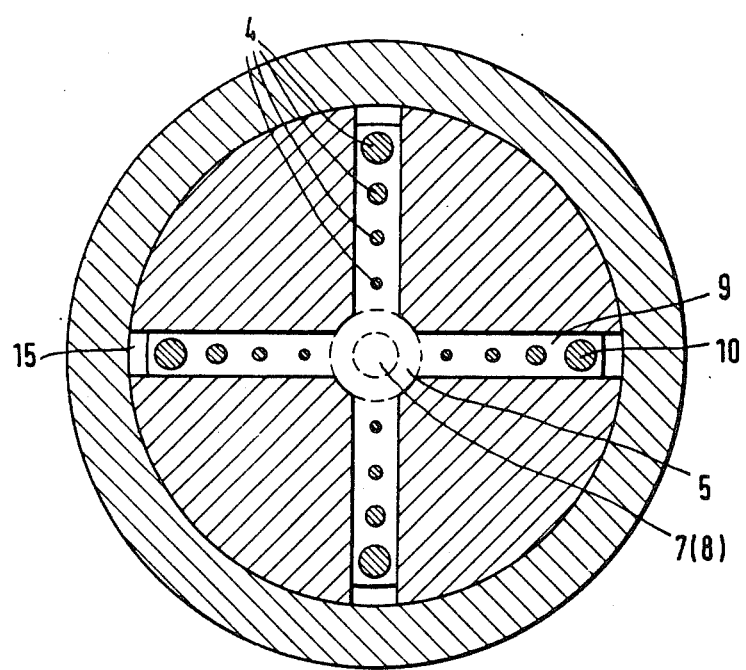
FIG. 9 is a sectional view of yet another embodiment of the throttle valve similar to those shown in FIGS. 7 and 8, but showing an arrangement in which there is a large number of electromagnets in each individual channel.

As shown in FIGS. 7 through 9, the flow channel 5 can also be designed in a star, cross or cruciform shape.

FIG. 7 illustrates an embodiment of the throttle valve in which its flow channel 5 is divided into individual flow channels 9 running radially outward in a cross or cruciform shape. In each individual flow channel 9, there is an armature 4 introduced by means of an electromagnet 2. With such an embodiment, the various flow resistances are set by the immersion of the armatures in the individual flow channels 9. The armature cross sections can be of different sizes as shown, or alternatively can all be the same size.

FIG. 8 also shows an embodiment in which the flow channel 5 includes several individual flow channels 9 which run outward in the form of a star. In this embodiment, there is again one electromagnet 2 and one armature 4 in each individual flow channel 9. The armature cross sections can be the same as shown in FIG. 8, or be of different sizes. By means of such a variable configuration, a non-linear flow characteristic can be achieved.

Finally, FIG. 9 shows still another embodiment, in which individual flow channels 9 of the flow channel 5 again run outward in the form of a cross. Now there are several electromagnets 2 arranged one after the other in each individual flow channel 9, and their armatures 4 either have the safe diameter or different diameters, as shown. The corresponding projected areas 10 of the armatures 4 thereby have the safe surface area as the cross section surface of the individual flow channel 9 or a smaller surface area, so that again, a number of applications can be achieved.

In FIGS. 1, 3, 5 and 6, a return system 14 is shown for the armature 4 of each electromagnet 2 being designed, for example, as a return spring. Depending upon the application, the return system 14 can be operated electromagnetically, or by the system pressure.

The invention as described hereinabove in the context of the preferred embodiments is not be taken as limited to all of the provided details thereof, since modifications and variations thereof may be made without departing from the spirit and scope of the invention.

What is claimed is:

1. A throttle valve for selectively varying the flow therethrough, said throttle valve comprising:
   (a) a housing;
   (b) a chamber formed within said housing, said chamber being substantially parallelepiped in shape and having a substantially greater length than width when viewed in plan;
   (c) first and second tubular members disposed at opposing extremities of said chamber, said tubular members being substantially parallel to said length of said chamber and being in fluid communication with said chamber;
   (d) a substantially planar plate disposed within said chamber so as to divide said chamber into first and second subchambers;
   (e) said plate being provided with throughgoing passages of substantially constant cross sectional area which establish fluid communication between said first and second subchambers;
   (f) a first multiplicity of bistable electromagnetically actuated armature translatably mounted in said housing adjacent sasid first subchamber, each of said first armatures being reciprocably translatable along a path substantially transverse to said substantially planar plate between a first position wherein each of said first armatures projects into said first subchamber and directly abuts said plate and a second position wherein each of said first armatures is retracted into said housing and does not project into said first subchamber;
   (g) a second multiplicity of bistable electromagnetically actuated armatures translatably mounted in said housing adjacent said second subchamber, each of said second armatures being reciprocably translatable along a path substantially transverse to said substantially planar plate between a first position wherein each of said second armatures projects into said second subchamber and directly abuts said plate and a second position wherein each of said second armatures is retracted into said housing and does not project into said first subchamber; and
   (h) electromagnetic actuation means for electromagnetically translating selected combinations of said first and second multiplicities of armatures between said first and second positions to thereby selectively alter the rate of fluid flow through said chamber and between said first and second tubular members over a wide ranges;

whereby selected members of said multiplicity of first armatures and selected members of said multiplicity of second armatures may simultaneously be translated into their first positions directly abutting said plate while still permitting fluid flow between said first and second tubular members through said chamber.

2. The throttle valve according to claim 1, wherein said throughgoing passages defining bypass means comprise two throughgoing passages, one each of said throughgoing passages being disposed adjacent one each of said first and second tubular members.

3. The throttle valve according to claim 1, wherein each armature of said first and second multiplicites of armatures has a cross section taken transverse to said axis of translation which is substantially circular.

4. The throttle valve according to claim 2, wherein each armature of said first and second multiplicites of armatures has a cross section taken transverse to said axis of translation which is suubstantial circular.

5. The throttle valve according to claim 1, wherein said first and second tubular members are aligned with one another and are disposed on a common central axis, and wherein said substantially planar plate is disposed such that said common central axis passes substantially through the center of gravity of said substantially planar plate.

6. The throttle valve according to claim 2, wherein said first and second tubular members are aligned with one another and are disposed on a common central axis, and wherein said substantially planar plate is disposed such that said common central axis passes substantially through the center of gravity of said substantially planar plate.

7. The throttle valve according to claim 3, wherein said first and second tubular members are aligned with one another and are disposed on a common central axis, and wherein said substantially planar plate is disposed such that said common central axis passes substantially through the center of gravity of said substantially planar plate.

8. The throttle valve according to claim 4, wherein said first and second tubular members are aligned with one another and are disposed on a common central axis, and wherein said substantially planar plate is disposed such that said common central axis passes substantially through the center of gravity of said substantially planar plate.

9. The throttle valve according to claim 1, wherein said throughgoing passages defining bypass means maintain a substantially constant area of interconnection between said first and second subchambers regardless of the positioning of any of said first and second multiplicities of aramtures.

* * * * *